(12) United States Patent
Bozynski et al.

(10) Patent No.: US 8,474,577 B2
(45) Date of Patent: Jul. 2, 2013

(54) REST POSITION ADJUSTER FOR BRAKE ACTUATING ELEMENT

(75) Inventors: Mariusz Bozynski, Curno (IT); Fabiano Carminati, Mozzo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 507 days.

(21) Appl. No.: 12/672,223

(22) PCT Filed: Sep. 25, 2007

(86) PCT No.: PCT/IT2007/000667
§ 371 (c)(1),
(2), (4) Date: Apr. 21, 2010

(87) PCT Pub. No.: WO2009/040836
PCT Pub. Date: Apr. 2, 2009

(65) Prior Publication Data
US 2011/0162921 A1    Jul. 7, 2011

(51) Int. Cl.
*B60L 3/00*     (2006.01)

(52) U.S. Cl.
USPC ..................... 188/24.22; 188/24.15

(58) Field of Classification Search
USPC ............. 188/151 R, 24.15, 24.22, 72.1, 72.4, 188/72.6, 196 R, 196 M; 60/594; 74/502.2, 74/502.6, 512, 522, 525
See application file for complete search history.

(56) References Cited

U.S. PATENT DOCUMENTS

| | | | | |
|---|---|---|---|---|
| 2,050,702 | A * | 8/1936 | Gardner | 188/196 M |
| 4,560,049 | A * | 12/1985 | Uchibaba et al. | 192/85.01 |
| 6,739,133 | B2 * | 5/2004 | Barnett | 60/594 |
| 6,883,647 | B1 * | 4/2005 | Wen | 188/24.22 |
| 7,204,088 | B2 * | 4/2007 | Uchiyama et al. | 60/594 |
| 7,222,703 | B2 * | 5/2007 | Laghi et al. | 188/344 |
| 7,516,616 | B2 * | 4/2009 | Tetsuka et al. | 60/533 |
| 7,546,909 | B2 * | 6/2009 | Campbell et al. | 188/24.22 |
| 7,621,380 | B2 * | 11/2009 | Wolfe | 188/2 D |
| 7,942,250 | B2 * | 5/2011 | Watarai et al. | 188/344 |
| 7,997,389 | B2 * | 8/2011 | Chen | 188/24.22 |
| 2005/0252370 | A1 | 11/2005 | Uchiyama et al. | |

FOREIGN PATENT DOCUMENTS

| | | |
|---|---|---|
| WO | 2003/047954 | 6/2003 |
| WO | 2005/087574 | 9/2005 |

* cited by examiner

*Primary Examiner* — Robert A Siconolfi
*Assistant Examiner* — Mariano Sy
(74) *Attorney, Agent, or Firm* — Shoemaker and Mattare

(57) ABSTRACT

A device for adjusting the release position of an operation element of a brake includes an articulated rod hinged and rotationally connected to the operation element. The articulated rod has an adjustment end provided with a pin having a threaded adjustment hole at least partly threaded and engaged with a threaded portion of a push rod, operatively connected to the operation element of the brake. The device comprises an anti-rotation device for preventing rotation of the push rod.

22 Claims, 4 Drawing Sheets

REST POSITION ADJUSTER FOR BRAKE ACTUATING ELEMENT

FIELD OF THE INVENTION

The present invention relates to an adjustment device for a release position of an operation element of a brake of a vehicle and a brake of a vehicle.

In particular, the present invention relates to an adjustment device for a release position of an actuating pedal of a motorcycle brake.

BACKGROUND OF THE INVENTION

As known, in the field of motorcycles, the need of allowing the adjustment of the release operation, that is, stand-by, of the operation elements of the brakes, such as the front brake lever and the actuating pedal of the rear brake, is felt.

Such adjustment is essentially needed for adjusting the release position of the brake operation elements to the user's driving position. For example, changing the release position of the actuating pedal of the rear brake of a motorcycle it is possible to allow a user to take a more comfortable driving position, with reference to the angle of inclination of the foot used for operating the rear brake lever.

As regards the actuating pedals of the rear brake, the solutions of the prior art envisage solutions that are very complex and expensive to make that consist for example in motor means that actuate gears intended for changing the pedal inclination in stand by or release condition.

SUMMARY OF THE INVENTION

The problem of the present invention is to provide an adjustment device which should solve the disadvantages mentioned with reference to the prior art.

Such disadvantages are solved by an adjustment device in accordance with claim 1.

Other embodiments of the adjustment device according to the invention are described in the subsequent claims.

BRIEF DESCRIPTION OF THE DRAWINGS

Further features and advantages of the present invention will appear more clearly from the following description of a preferred non-limiting embodiment, wherein.

DETAILED DESCRIPTION OF THE INVENTION

Figure 1:
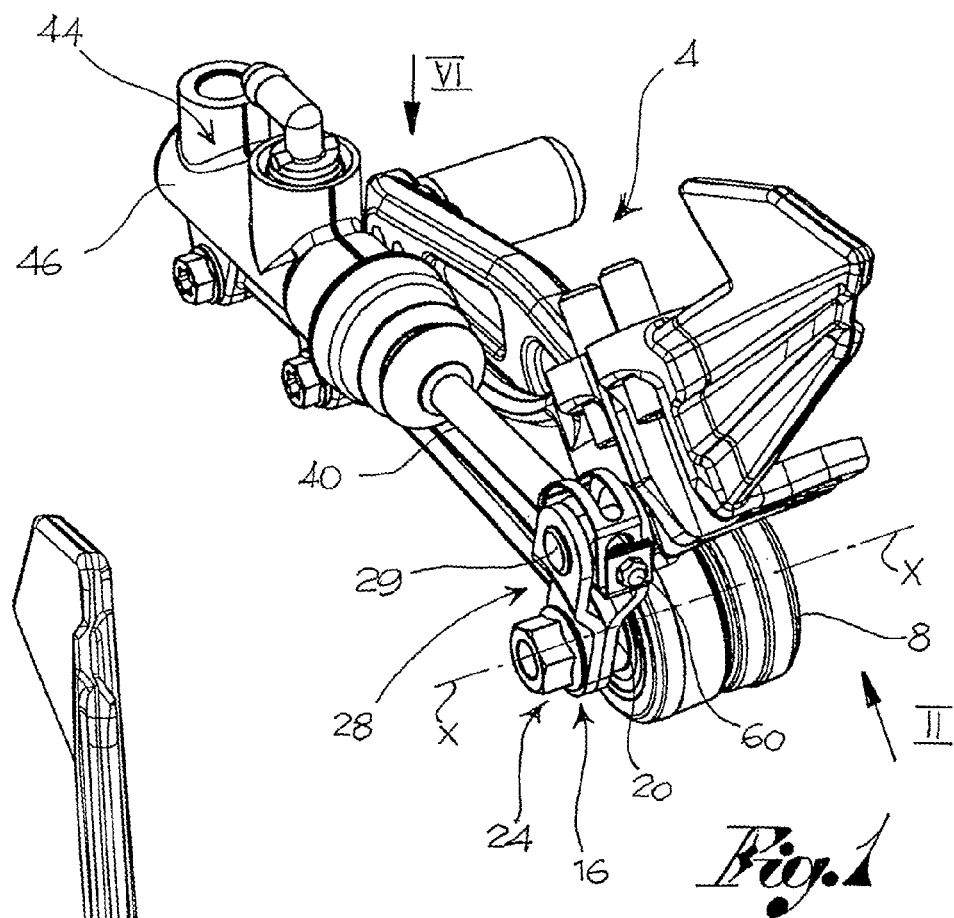
FIG. 1 shows a perspective view of an adjustment device according to an embodiment of the present invention.
Figure 2:
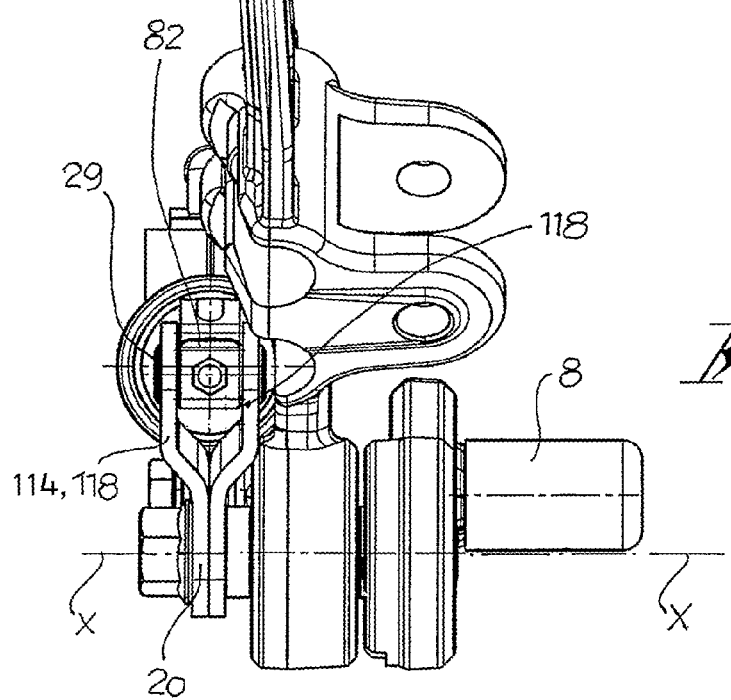
FIG. 2 shows a view of the adjustment device of FIG. 1 from the side of arrow II of FIG. 1.
Figure 3:
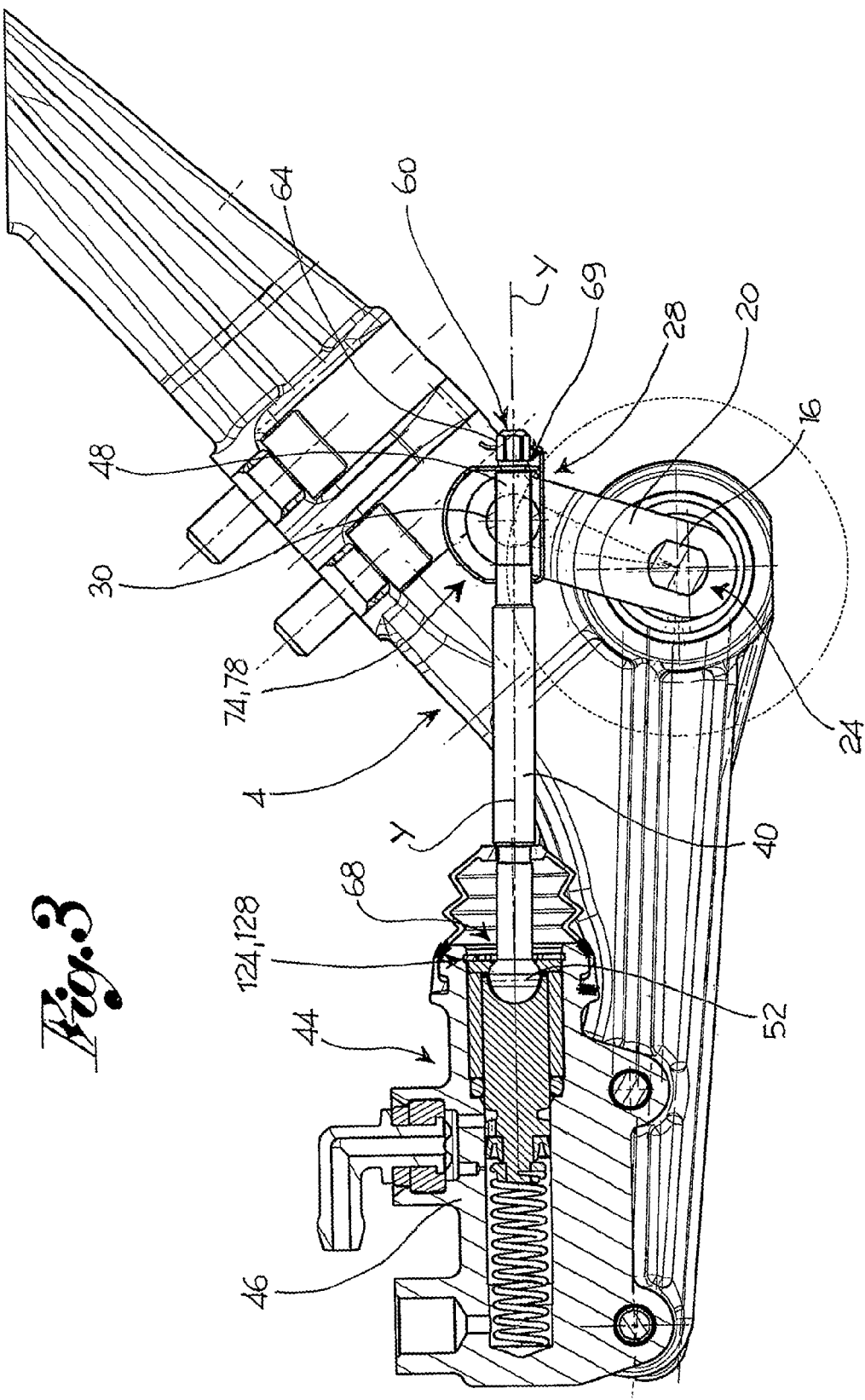
FIG. 3 shows a cutaway view of the adjustment device of FIG. 1.
Figure 4:
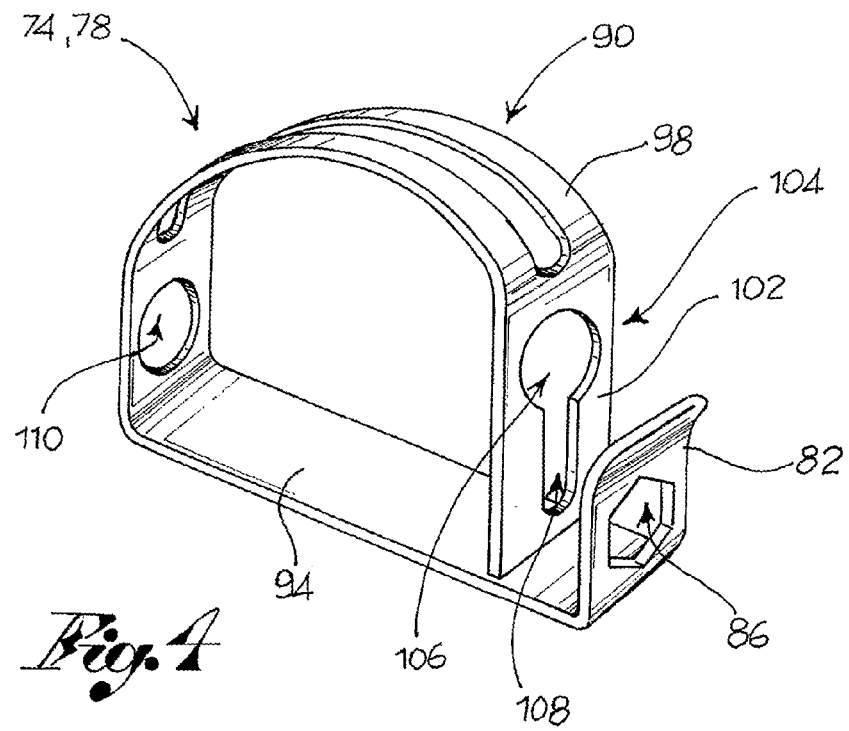
FIG. 4 shows a perspective view of a detail of a detail of the adjustment device of FIG. 1.
Figure 5:
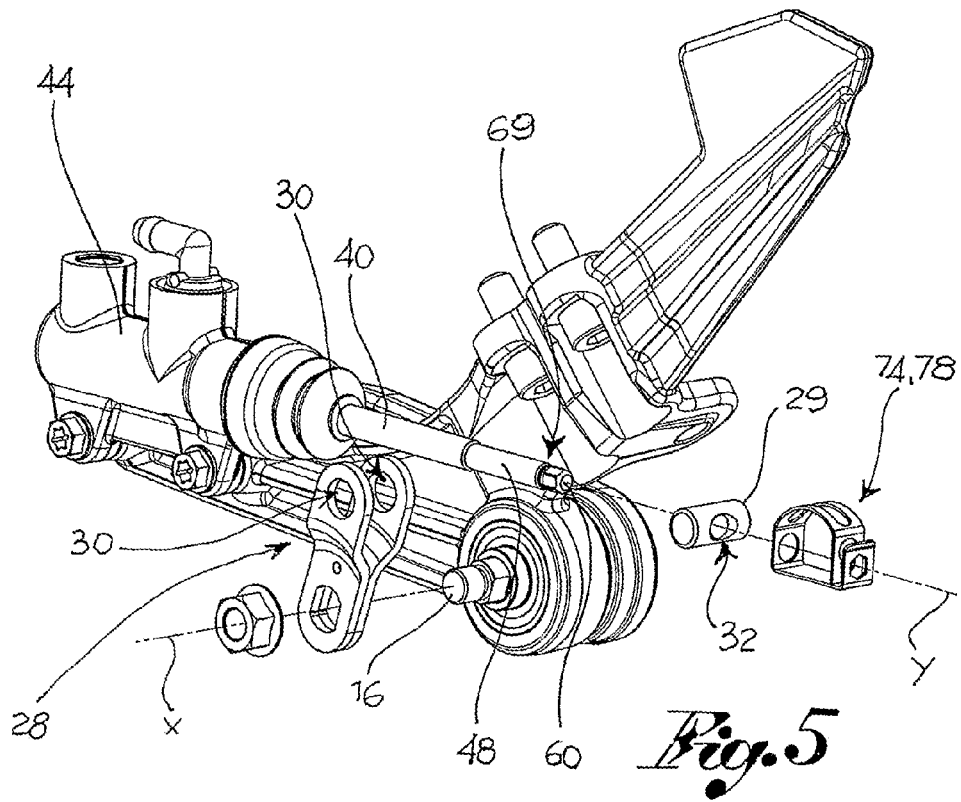
FIG. 5 shows an exploded perspective view of some details of the adjustment device of FIG. 1.
Figure 6:
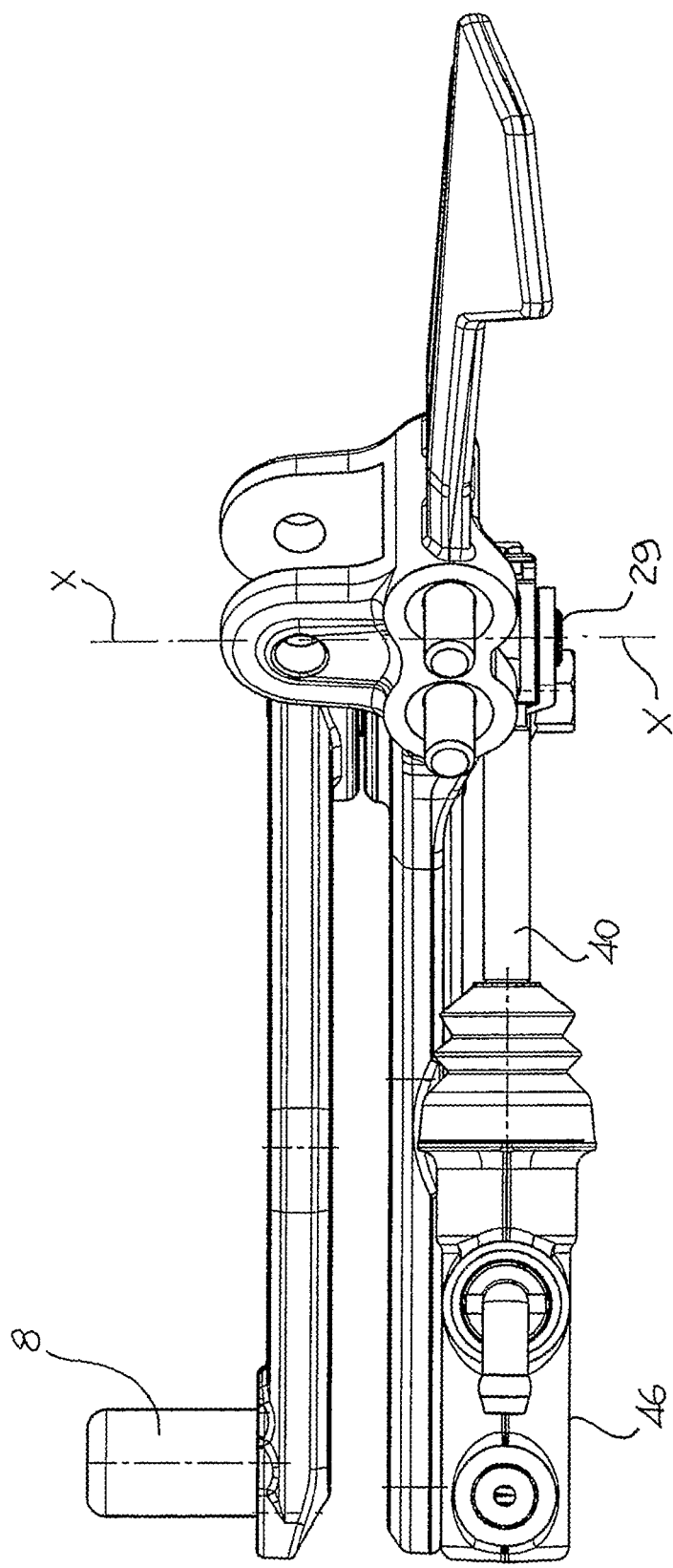
FIG. 6 shows a view of the device of FIG. 1 from the side of arrow VI of FIG. 1.

With reference to the above figures, reference numeral 4 generically denotes an adjustment device for the stand by or release position of an operation element 8 of a brake of a vehicle.

The brake could for example be a disc or drum brake.

The operation element 8 may be a lever or a pedal.

According to an embodiment, the operation element 8 is hinged in a fulcrum 16 so as to rotate thereabout along a hinge axis X-X. For example the operation element may be a lever or a pedal.

For example, device 4 comprises an articulated rod 20, preferably hinged in said fulcrum 16, at a hinging end 24. The articulated rod 20 is connected in rotation to the operation element 8.

The articulated rod 20 comprises an adjustment end 28, opposite the hinging end 24, provided with a pin 29 arranged parallel to the hinge axis X-X and seated in special holes 30. Said pin 29 is provided with at least one adjustment hole 32 at least partly internally threaded. Said pin 29 is turnably inserted in said holes 30.

According to an embodiment, the adjustment hole 32 is directed along an axis substantially perpendicular to the hinge axis X-X.

Device 4 comprises a push rod 40, operatively connected to operation means 44 of the brake.

According to an embodiment, the operation means are operation means of the hydraulic type, such as a pump 46.

Push rod 40 comprises a threaded portion 48 at least partly screwed in said adjustment hole 32 of pin 29 associated to articulated rod 20 so as to mechanically connect articulated rod 20 and the operation element 8 to the operation means 44 of the brake.

The screwing position between push rod 40 and pin 29 of articulated rod 20 is variable so as to change the angular released position of the operation element 8.

In other words, rotating the threaded portion 48 relative to the adjustment hole 32, a shifting of pin 29 and thereby of the adjustment end 28 is actuated along the threaded portion 48 and thereby a rotation of articulated rod 20 about fulcrum 16. By rotating, the articulated rod 20 drives in rotation the operation element 8 and changes the release position thereof.

Push rod 40 extends along an adjustment axis Y-Y, preferably perpendicular to said hinge axis X-X.

According to an embodiment, push rod 40 comprises at least one turning portion relative to the adjustment axis Y-Y so as to rotate inside the adjustment hole 32 and change the angular position of articulated rod 20 and of the operation element 8 relative to fulcrum 16.

Preferably, the push rod 40 is turnably connected to the operation means 44, so as to rotate about the adjustment axis Y-Y while keeping the mechanical connection with the operation means 44.

Preferably, the push rod comprises a spherical articulation coupling 52 with the operation means 44, suitable for allowing a relative inclination between push rod 40 and the operation means 44 and a relative rotation of push rod 40 relative to the operation means 44 along said adjustment axis Y-Y.

Push rod 40 comprises an operating portion 60 suitable for carrying out the rotation of push rod 40 relative to the adjustment axis Y-Y.

Preferably, the operating portion 60 is arranged at a free end 64 of push rod 40, opposite a connection end 68 of push rod 40 to the operation means 44. Push rod 40 between the threaded portion 48 and the operating portion 60 comprises a groove 69.

For example, the operating portion 60 comprises a section suitable for making a shape coupling suitable for allowing the driving in rotation of the push rod.

Preferably, the operating portion 60 comprises a hexagonal section suitable for being rotated by a suitable operating wrench.

According to an embodiment, device 4 comprises anti-rotation means 74, suitable for locking in rotation the push rod 40 relative to the adjustment axis Y-Y, in a predetermined position.

For example, the anti-rotation means 74 comprise a spring 78 having a tab 82 provided with a locking hole 86 having complementary section relative to said operating portion 60 of push rod 40 so as to make spring 78 integral in rotation with push rod 40.

Preferably, the locking hole 86 and the operating portion 60 have hexagonal section.

Spring 78 comprises a body 90 connected to tab 82 and suitable for obtaining a lock in rotation of spring 78 and of push rod 40 relative to the adjustment axis Y-Y.

Preferably, in an assembly configuration, body 90 is arranged at least partly about push rod 40 so as to interfere in rotation, relative to the adjustment axis Y-Y, with the articulated rod 20, performing the anti-rotation function.

According to an embodiment, body 90 comprises a reaction rod 94, connected to said tab 82, and an arc portion 98 suitable for imparting elasticity to spring 78 relative to a direction parallel to the adjustment axis Y-Y.

According to an embodiment, the arc portion 98 comprises a stopping plate 102, arranged astride of push rod 40, between the free end 64 of push rod 40 and the threaded portion 48 so as to prevent the extraction of spring 78 from push rod 40 along said adjustment axis Y-Y.

According to an embodiment, the stopping plate 102 comprises a first passage hole 104 provided with an opening 106, suitable for allowing the passage of the operating portion 60 of push rod 40, and with a slit 108 suitable for axially constraining spring 78 between the threaded portion 48 and the gripping portion 60, said slit 108 being suitable for associating to groove 69.

According to an embodiment, the arc portion 98 comprises a second passage hole 110 suitable for allowing the passage of the threaded portion 48.

Preferably, articulated rod 20 comprises at least one stop 114 suitable for preventing the rotation of spring 78 relative to the adjustment axis Y-Y.

According to an embodiment, said stop 114 is obtained by a fork portion 118, at the adjustment end 28 of articulated rod 20, suitable for embracing body 90 of spring 78 and preventing the rotation thereof relative to the adjustment axis Y-Y.

In other words, articulated rod 20 comprises a fork portion 118 that seats and embraces spring 78 so that a rotation of spring 78 relative to the adjustment axis Y-Y is prevented by the contact between the spring itself and the branches of said fork portion 118.

The operation means 44 comprise stopping means 124 suitable for fixing the release position of the connection end 68 of the push rod with the operation means 44.

For example, the stopping means comprise a washer 128 retained by a snap ring suitable for receiving in abutment and stopping said connection end 68 of the push rod 40 in release condition so as to define the release position of the operation element 8.

The operation of a device according to the present invention shall now be described.

In release conditions, the articulated rod 20 is engaged with push rod 40 thanks to the screwing of the threaded portion 48 in the adjustment hole 32 of pin 29. The stopping means 124, such as washer 128, determine the push rod position in release position, and thereby the angular orientation of articulated rod 20 and of the operation element 8 relative to the hinge axis X-X. In these conditions, a rotation of push rod 40 relative to the adjustment hole 32 of pin 29 of articulated rod 20 is prevented by spring 78. In fact, spring 78 is constrained in rotation to push rod 40 thanks to the coupling, for example by shape, between tab 82 and the operating portion 60. Moreover, the spring cannot rotate relative to the adjustment axis Y-Y since a rotation thereof would lead body 90 of spring 78 to interfere against stop 114 or the fork portion 118.

The spring cannot slide axially, parallel to the adjustment axis Y-Y, along push rod 40. In fact, the stopping plate 102 is axially constrained between the threaded portion 48 and the operating portion 60, since slit 108 has a smaller size than that of the threaded portion 48 and of the operating portion 60. In particular, slit 108 of the stopping plate 102 is inserted in groove 69.

To adjust the position of the operation element 8, the anti-rotation spring 78 must be released from push rod 40.

For example, a hexagonal socket wrench may be inserted on the free end 64 side of push rod 40. The socket wrench engages by shape coupling with the operating portion 60, so as to become integral in rotation with push rod 40. Moreover, the socket wrench exerts an axial thrust, along the adjustment axis Y-Y, on tab 82 that axially shifts on the operating portion 60 up to release therefrom.

In particular, the thrust exerted by the socket wrench is transmitted to the reaction rod 94 and hence to the arc portion 98 that bends allowing the axial shifting of the reaction rod 94 and thereby of tab 82, up to release the latter from the operating portion 60.

The elastic bend of the arc portion 98 is obtained thanks to the fact that said portion is axially constrained to the push rod at the stopping plate 102.

After releasing tab 82, it is possible to turn the socket wrench so as to change the axial screwing position of the adjustment hole 32 along the threaded portion 48. In this way, the angular position of articulated rod 20 and of the operation element 8 relative to the hinge axis X-X is changed.

After obtaining the desired position of the operation element 8, the socket wrench is removed from the push rod; in this way the spring elastically recovers the original shape, and in particular the arc portion 98 elastically recalls the reaction rod 94 and tab 82 towards the hexagonal element 70, so as to make the tab couple with the operating portion 60 again.

As can be appreciated from the description, the adjustment device of the present invention allows overcoming the disadvantages of the prior art.

In particular, the device allows making the adjustment of the release position of the operation element, such as an actuating pedal of a brake, in a quick and precise manner.

The device is inexpensive to manufacture and to quick to adjust.

The adjustment is accurate and safe, also thanks to the anti-rotation spring that prevents any rotation of the device with relevant loss of the calibration of the release position of the operation element.

The device is not subject to locking due to the presence of dust or dirt.

The adjustment takes place quickly by the simple use of a socket wrench. It is even sufficient to use a single hand by which the user can introduce the socket wrench on the push rod adjustment end, push thereon applying a moderate strength so as to release the anti-rotation spring and turn the wrench so as to change the pedal release position as desired.

To lock the desired release position of the pedal it is sufficient to remove the socket wrench so as to allow the tab of the spring to couple with the push rod adjustment end.

A man skilled in the art can make several changes and adjustments to the devices described above in order to meet specific and incidental needs.

For example, the device of the present invention may be applied to different types of brakes, such as disc brakes but also drum brakes.

Moreover, the push rod may be replaced by any connecting member that transfers the movements of the operation element to the brake actuators.

The operation element may be an operation pedal of a brake, but also a lever or any other element suitable for being actuated by the user.

These and other variations to the described devices fall within the scope of protection as defined by the following claims.

The invention claimed is:

1. Adjustment device for maintaining a standby or release position of an operation element of a brake of a vehicle,
    the operation element being hinged on a fulcrum so as to rotate thereon about a hinge axis,
    the device comprising an articulated rod hinged on said fulcrum at a hinging end, the articulated rod being connected in rotation to the operation element,
    the articulated rod comprising an adjustment end, opposite the hinging end, provided with a pin having at least one adjustment hole at least partly threaded,
    the device comprising a push rod, operatively connected to operation means of the brake,
    the push rod having a threaded portion at least partly screwed into said adjustment hole of said articulated rod so as to mechanically connect said articulated rod and the operation element to the operation means of the brake, the screwing position between the push rod and the articulated rod being variable so as to change the angular released position of the operation element relative to the hinge axis,
    the device comprising anti-rotation means, suitable for locking the push rod against rotation, wherein
    said push rod comprises an operating portion suitable for rotating the push rod relative to an adjustment axis,
    said operating portion is arranged at a free end of the push rod, opposite a connection end of the push rod to the operation means and comprises a hexagonal section suitable for being rotated by a counter shaped wrench,
    wherein the anti-rotation means comprise a spring having a tab provided with a locking hole having a complementary section relative to said operating portion of the push rod so as to make the spring integral in rotation with the push rod.

2. Device according to claim 1, wherein the adjustment hole is directed along said adjustment axis substantially perpendicular to the hinge axis.

3. Device according to claim 1, wherein said push rod extends along said adjustment axis perpendicular to said hinge axis.

4. Device according to claim 1, wherein the push rod comprises at least one turning portion relative to the adjustment axis so as to rotate inside the adjustment hole and change the angular position of the articulated rod and of the operation element relative to the hinge axis.

5. Device according to claim 1, wherein said push rod is turnably connected to the operation means, so as to rotate about the adjustment axis while keeping the mechanical connection with the operation means.

6. Device according to claim 1, wherein the push rod comprises a spherical articulation coupling with the operation means, suitable for allowing a relative inclination between the push rod and the operation means and a relative rotation of the push rod relative to the operation means along said adjustment axis.

7. Device according to claim 1, wherein the locking hole and the operating portion have hexagonal section.

8. Device according to claim 1, wherein the spring comprises a body connected to the tab and suitable for obtaining a lock in rotation of the spring and of the push rod relative to the adjustment axis.

9. Device according to claim 8, wherein the body is arranged at least partly about the push rod so as to interfere in rotation, relative to the adjustment axis, with the articulated rod, performing the anti-rotation function.

10. Device according to claim 8, wherein the body comprises a reaction rod, connected to said tab, and an arc portion suitable for imparting elasticity to the spring relative to a direction parallel to the adjustment axis.

11. Device according to claim 10, wherein said arc portion comprises a stopping plate, arranged astride of the push rod, between the operation portion of the push rod and the threaded portion so as to prevent extraction of the spring from the push rod along said adjustment axis.

12. Device according to claim 11, wherein the stopping plate comprises a first passage hole provided with an opening, suitable for allowing passage of the operating portion of the push rod, and with a slit suitable for axially constraining the spring between the threaded portion and the connection end.

13. Device according to claim 12, wherein the push rod comprises a groove arranged between the threaded portion and the operating portion, said slit being suitable for associating to the groove.

14. Device according to claim 12, wherein said arc portion comprises a second passage hole suitable for allowing passage of the threaded portion.

15. Device according to claim 1, further comprising a stop suitable for preventing rotation of the spring relative to the adjustment axis.

16. Device according to claim 15, wherein said stop is obtained by a fork portion, at the adjustment end of the articulated rod, suitable for embracing the body and preventing the rotation thereof relative to the adjustment axis.

17. Device according to claim 1, wherein said operation element is a brake pedal.

18. Brake for a vehicle, comprising a device according to claim 1.

19. Brake for vehicle according to claim 18, wherein said operation means comprise stopping means suitable for fixing the release position of the connection end of the push rod with the operation means.

20. Brake for vehicle according to claim 19, wherein said stopping means comprise a washer suitable for receiving in abutment and stopping said connection end of the push rod in a release condition so as to define the release position of the operation element.

21. Brake for vehicle according to claim 18, wherein said operation means are of a hydraulic type.

22. Brake for vehicle according to claim 18, wherein said brake is a disc brake or a drum brake.

* * * * *